US010375316B2

(12) United States Patent
Kobayashi et al.

(10) Patent No.: US 10,375,316 B2
(45) Date of Patent: Aug. 6, 2019

(54) IMAGING DEVICE PROVIDED WITH HIGH DYNAMIC RANGE RENDERING FUNCTION

(71) Applicant: DENSO CORPORATION, Kariya, Aichi pref. (JP)

(72) Inventors: Kazuhiko Kobayashi, Kariya (JP); Toshikazu Murao, Kariya (JP); Masato Nishikawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 15/722,838

(22) Filed: Oct. 2, 2017

(65) Prior Publication Data

US 2018/0097984 A1 Apr. 5, 2018

(30) Foreign Application Priority Data

Oct. 3, 2016 (JP) .................. 2016-195723

(51) Int. Cl.
H04N 5/235 (2006.01)
H04N 5/355 (2011.01)
H04N 5/376 (2011.01)

(52) U.S. Cl.
CPC ......... H04N 5/2355 (2013.01); H04N 5/2352 (2013.01); H04N 5/2356 (2013.01); H04N 5/35536 (2013.01); H04N 5/35554 (2013.01); H04N 5/35581 (2013.01); H04N 5/3765 (2013.01)

(58) Field of Classification Search
None
See application file for complete search history.

(56) References Cited

U.S. PATENT DOCUMENTS

| 8,947,550 | B2* | 2/2015 | Minato | H04N 5/23232 348/222.1 |
| 2004/0252224 | A1* | 12/2004 | Shiraishi | H04N 5/232 348/362 |
| 2006/0151718 | A1* | 7/2006 | Kondo | B82Y 10/00 250/492.2 |
| 2009/0153699 | A1* | 6/2009 | Satoh | H04N 5/2353 348/229.1 |

(Continued)

FOREIGN PATENT DOCUMENTS

JP 2010118767 A 5/2010
JP 2015-192222 11/2015

Primary Examiner — Cynthia Segura
(74) Attorney, Agent, or Firm — Knobbe, Martens, Olson & Bear, LLP

(57) ABSTRACT

An imaging device performs imaging using an imaging element. The imaging device is provided with an imaging unit, a control unit and a synthesis unit. The imaging unit performs exposure with a predetermined exposure time, thereby performing image capture. The control unit successively performs an imaging process N-times. In each imaging process, a plurality of images are captured with different exposure times. The synthesis unit generates, using HDR rendering, a plurality of images acquired by the plurality of image captures. The control unit performs one of the plurality of image captures such that the exposure is completed at a corresponding synchronous timing, and performs a subsequent other image capture such that exposure is started at the synchronous timing.

5 Claims, 2 Drawing Sheets

(56) References Cited

U.S. PATENT DOCUMENTS

| | | | |
|---|---|---|---|
| 2011/0242368 A1* | 10/2011 | Haneda | H04N 5/235 348/239 |
| 2013/0028473 A1* | 1/2013 | Hilldore | G06K 9/00798 382/103 |
| 2013/0113886 A1* | 5/2013 | Seo | H04N 13/211 348/46 |
| 2014/0218575 A1* | 8/2014 | Yanai | H04N 5/3532 348/296 |
| 2014/0320694 A1* | 10/2014 | Okuno | H04N 5/2351 348/229.1 |
| 2015/0201168 A1 | 7/2015 | Naitoh et al. | |
| 2015/0222800 A1 | 8/2015 | Hirooka et al. | |
| 2016/0125575 A1* | 5/2016 | Takahashi | G06T 5/50 382/275 |
| 2018/0323225 A1* | 11/2018 | Nakamura | H01L 27/146 |

* cited by examiner

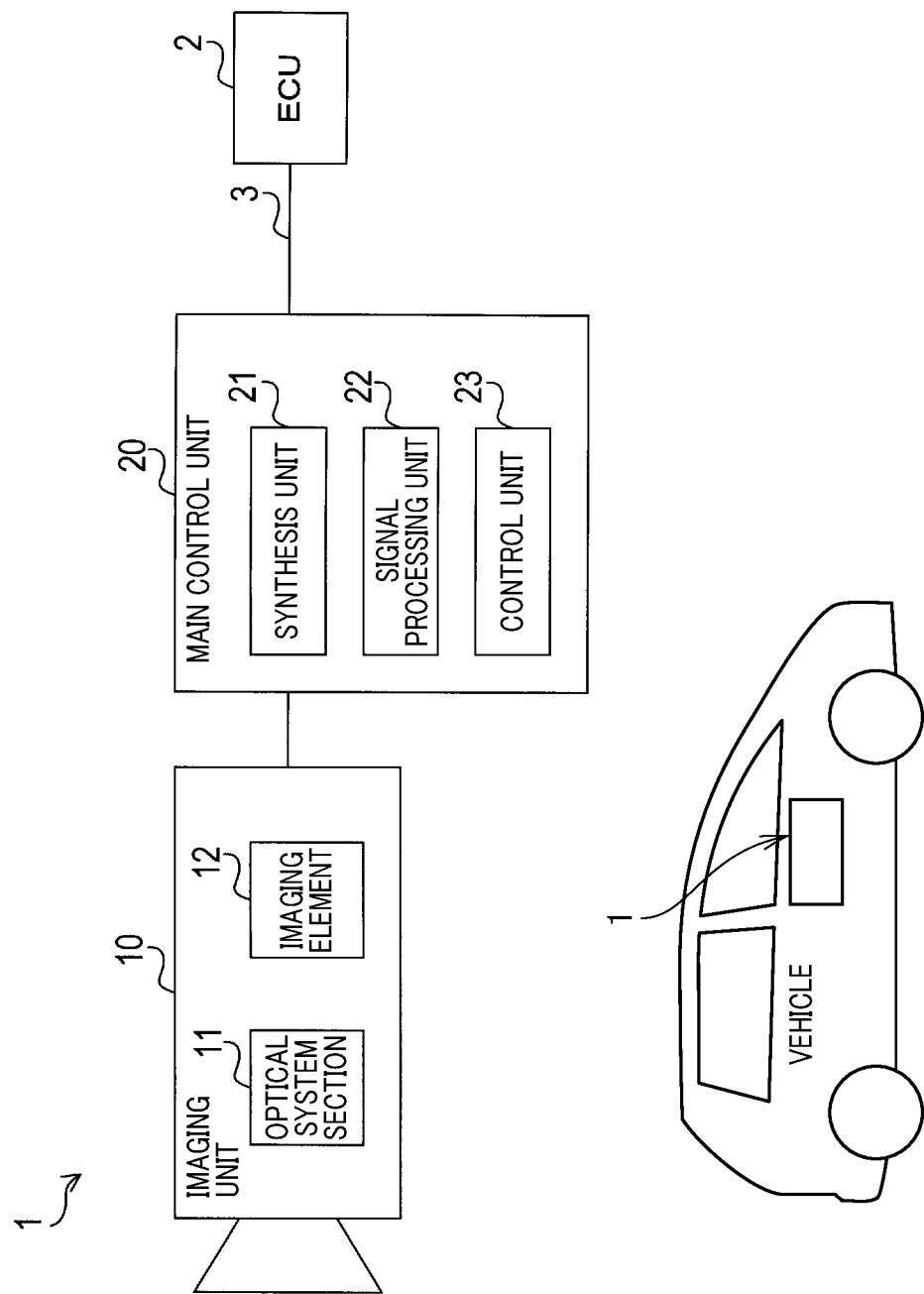

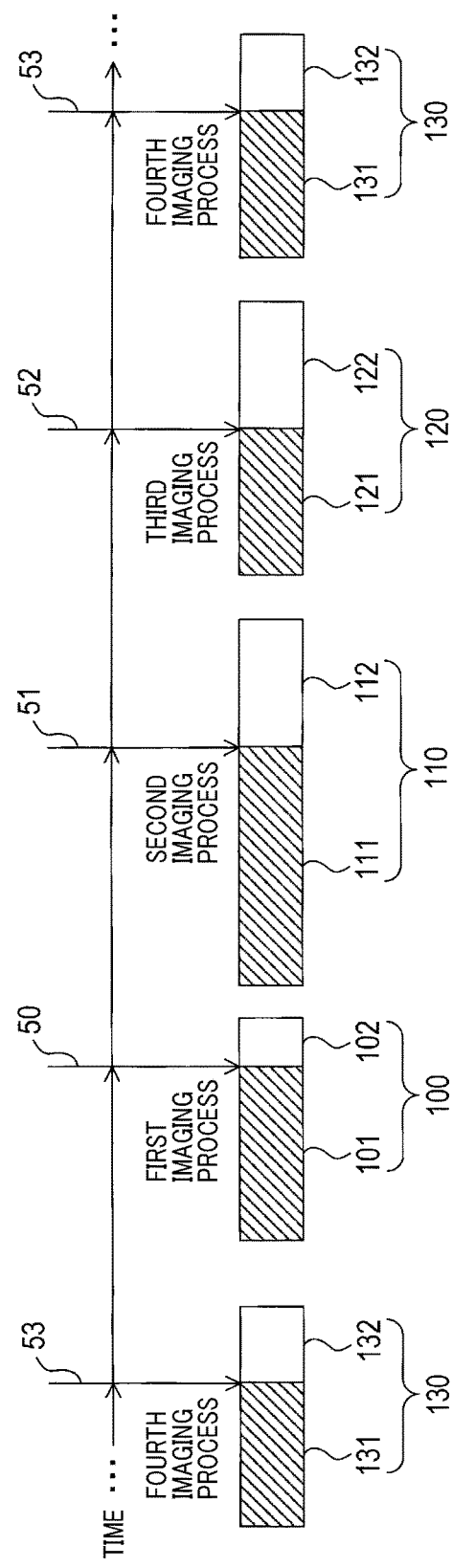

IMAGING DEVICE PROVIDED WITH HIGH DYNAMIC RANGE RENDERING FUNCTION

CROSS-REFERENCE TO RELATED APPLICATION

This application is based on and claims the benefit of priority from earlier Japanese Patent Application No. 2016-195723 filed Oct. 3, 2016, the description of which is incorporated herein by reference.

BACKGROUND OF THE INVENTION

Technical Field

The present disclosure relates to imaging devices. More particularly, the present disclosure relates to image devices provided with high dynamic range rendering function.

Description of the Related Art

An imaging process system provided in a vehicle is known. The imaging process system in the vehicle is generally used for various driving assist functions. For example, JP-A-2010-118767 discloses an imaging process system for a vehicle, in which a plurality of images are consecutively captured corresponding to different driving assist functions. These imaging operations are performed using different shutter speeds corresponding to respective driving assist functions, and various parameters used for the driving assist functions are acquired from the captured images corresponding to respective driving assist functions.

However, imaging using the imaging process system disclosed by the above-mentioned patent literature is unlikely to obtain a captured image having sufficient dynamic range. In this respect, a captured image can be obtained with expanded dynamic range, when performing high dynamic range rendering (hereinafter referred to as HDR rendering).

For driving assist of vehicles, real-time captured images are required. Hence, when synthetic images by the HDR rendering are used for the driving assist, a plurality of image captures with different exposure times have to be captured in a short period of time. Accordingly, in the case where a plurality of HDR renderings are performed in order to provide a plurality of synthesis images having different image qualities for the driving assist, exposure periods of respective image captures may be overlapped. Then, in order to avoid the overlapping periods, the length of exposure time has to be limited or generation of synthesis images may be delayed.

SUMMARY

The present disclosure provides, by using HDR rendering, a technique for appropriately and smoothly generating a plurality of synthesis images having different image qualities.

An imaging device performs an imaging using an imaging element. The imaging device is provided with an imaging unit, a control unit and a synthesis unit. The imaging unit performs exposure with a predetermined exposure time, thereby performing imaging. Also, the control unit successively performs an imaging process N-times thereby performing a plurality of imaging processes, where N is an integer and 2 or higher, a plurality of image captures with different exposure times being performed by the imaging unit in each of the imaging processes. The synthesis unit generates, by using HDR rendering based on a plurality of images acquired by the plurality of image captures, a synthesis image having an expanded dynamic range and being generated for each of the N-times imaging processes.

Also, each of the synthesis images generated by each of the N imaging processes has an image quality determined corresponding to the synthesis image. The maximum exposure time as a maximum value in the respective capturing of each of the N-time imaging processes is determined depending on the synthesis image generated by the imaging process. Each of the N-time imaging process corresponds to each of the synchronous timings which are periodically executed N times at regular intervals.

The control unit successively performs, in each of the N-times imaging processes, the plurality of image captures before/after the corresponding synchronous timing.

The control unit performs one of the plurality of image captures such that the exposure is completed at the synchronous timing, and performs a subsequent other capturing such that the exposure is started at the synchronous timing. An exposure timing is determined in each of the imaging process based on the maximum exposure time such that exposure times in the N-times imaging processes are not overlapped.

According to these configurations, a plurality of images are captured in each of the N-times imaging processes before/after the synchronous timing. Thus, as a total exposure time of a plurality of image captures in each of the imaging processes, longer period can be secured than each interval between the synchronous timings. Further, an interval can be shortened between a plurality of image captures in the preceding imaging process and a plurality of image captures in the subsequent imaging process.

Therefore, an appropriate exposure time can be secured in the respective imaging processes of the N-times imaging processes. Thus, with the HDR synthesis rendering based on the captured images acquired in the respective imaging processes, synthesis images having appropriate image qualities can be generated. Also, time required for capturing images can be reduced. Accordingly, a plurality of synthesis images having different synthesis images can be smoothly and appropriately generated.

It should be noted that the bracketed reference signs in this column and in the claims indicate correspondence to specific means in the embodiments described later, and do not limit the technical scope of the present disclosure.

BRIEF DESCRIPTION OF THE DRAWINGS

In the accompanying drawings:

FIG. 1 is a block diagram showing an imaging device according to an embodiment of the present disclosure; and FIG. 2 is an explanatory diagram illustrating an imaging process performed by the imaging device according to the embodiment.

DESCRIPTION OF THE PREFERRED EMBODIMENTS

With reference to the drawings, hereinafter will be described an embodiment of the present disclosure.

1. Configuration

As shown in FIG. 1, an imaging device of the present embodiment is mounted on a vehicle. Hereinafter, a vehicle in which the imaging device 1 is mounted is also referred to as an own vehicle. The imaging device 1 captures images around the own vehicle (e.g., ahead of the own vehicle). The images captured by the imaging device 1 are used for a driving assist of the own vehicle, which is performed by an ECU 2 (electronic control unit 2) mounted on the own vehicle.

The driving assist may be automatic driving. In automatic driving, driving operations are automatically performed, these driving operations including acceleration, braking, and steering operations of the own vehicle. Specific examples of automatic driving may include control of the own vehicle in which the own vehicle travels automatically to the destination, or the own vehicle tracks another vehicle running ahead of the own vehicle, that is, a preceding vehicle. Moreover, automatic driving may include a control in which the own vehicle travels with automatic acceleration or braking, with the travelling speed being automatically controlled, or a control in which the own vehicle travels with automatic steering, under the travelling route being automatically controlled. Furthermore, the driving assist may be collision avoidance, speed warning, rear-end collision warning, inter-vehicle distance warning, lane-departure warning or the like. It should be noted that the collision avoidance may be referred to as an avoidance operation that avoids collision by performing braking control, or steering control when the own vehicle is likely to collide with an object.

The imaging device 1 is configured as a camera. Specifically, the imaging device 1 includes an imaging unit 10 and a main control unit 20. The imaging unit 10 includes an optical system section 11 and a plurality of imaging elements 12.

The optical system section 11 includes a lens (not shown), an aperture unit and a shutter or the like. The lens allows incident visible light to form an image on a plurality of imaging elements 12. The aperture unit adjusts an amount of visible light that passes through the lens based on the aperture ratio. The visible light passing through the aperture unit is incident on the plurality of imaging elements 12. The shutter is configured to be opened/closed at a predetermined shutter speed when an image is captured. Thus, an exposure is performed for an exposure time determined by the shutter speed. In other words, visible light is incident on the plurality of imaging elements 12 for the exposure time.

The plurality of imaging devices 12 includes a plurality of CMOS (complementary metal oxide semiconductor) sensors or a plurality of CCD (charge coupled device) sensors. These imaging elements 12 are arranged in a lattice shape (in other words, arrayed shape). Each of the imaging element 12 outputs an analog signal that indicates intensity of the incident visible light. The analog signal is amplified with a predetermined gain and outputted to the main control unit 20.

The main control unit 20 includes a synthesis unit 21, a signal processing unit 22 and a control unit 23. The signal processing unit 22 generates RGB or YUV type image data (hereinafter also referred to as RAW data) based on the analog signals transmitted from the plurality of imaging elements 12.

The synthesis unit 21 performs a high dynamic range rendering (hereinafter also referred to as HDR rendering) based on a plurality of RAW data generated by the signal processing unit 22. Hereinafter, the captured image obtained by the HDR rendering is also referred to as a synthesis image. The synthesis image is provided to the ECU 2 via a vehicle LAN 3 or the like. The ECU 2 performs a driving assist based on the above-described synthesis image.

The HDR rendering is performed thereby generating a captured image having expanded dynamic range compared to the captured image data indicated by the plurality of RAW data. More specifically, phenomena of so called white overexposure or black underexposure can be suppressed so that a captured image having more precise gradation is generated. Therefore, in the driving assist by the ECU 2, high accuracy image recognition can be performed based on the synthesis image. It should be noted that processes of imaging for HDR rendering will be described later.

The control unit 23 captures images by controlling the imaging unit 10. The control unit 23 sets image parameters in the imaging unit 10. The image parameter includes, for example, a shutter speed (i.e., exposure time), an aperture value, a gain used for amplifying an analog signal. The imaging unit 10 captures images in accordance with the image parameters set by the control unit 23.

The synthesis unit 21, the signal processing unit 22 and the control unit 23 may be mainly configured of a known microcomputer having CPU, RAM, ROM and semiconductor memory such as flash memory. In other words, these portions accomplish the above-described functions by executing the program stored in the semiconductor memory with the CPU. The semiconductor memory corresponds to the non-transitory tangible recording media. These portions may be configured of digital circuits including number of logic circuits. The above-described functions may be accomplished by hardware not by software.

2. Imaging

Next, an imaging process for the HDR rendering will be described in detail. The control unit 23 in the main control unit 20 of the imaging unit 1 performs imaging process for the above-described HDR rendering. In the imaging process, the imaging unit 10 executes two types of imaging including a long-period exposure imaging and a short-period exposure imaging are consecutively performed twice. The exposure time of the long-period exposure imaging is longer than the short-period exposure imaging. Also, the image parameters excluding the exposure time may be different between the long-period exposure imaging and the short-period imaging. The synthesis unit 21 performs the HDR rendering based on two RAW data generated by the long-period exposure imaging and the short-period exposure imaging.

Also, the imaging unit 1 generates, by using the HDR rendering, four types of synthesis images, i.e., synthesis images 1 to 4. The synthesis images 1 to 4 correspond to different image objects. Each of the synthesis images 1 to 4 has an image quality suitable for recognizing the image object corresponding to the synthesis image in the driving assist. In other words, the image qualities of respective synthesis images are determined based on captured images corresponding to the synthesis images. In the driving assist, the image object corresponding to the synthesis image in the synthesis images can be recognized.

In the respective image capture of the imaging process, the exposure time may be adjusted based on an environment around the own vehicle (e.g., brightness or the like). Hereinafter, a maximum value of an exposure time of such an imaging process is referred to as a maximum exposure time. On the other hand, an exposure time in the respective capturing of the imaging process may be fixed. Hereinafter, a fixed exposure time of such an imaging process is referred to as a maximum exposure time.

The imaging processes to produce the synthesis images 1 to 4 are referred to as the first to fourth imaging processes.

The control unit 23 adjusts, based on the image quality of the synthesis image (in other words, image object), the image parameters in the respective capturing of the imaging process. Especially, in order to favorably recognize the above-described image objects from the synthesis images, each exposure time of respective image captures in the first to fourth imaging processes have to be determined based on each image object corresponding to the imaging process. Hence, in each image capture in the imaging processes, at least the maximum exposure time is inherently determined based on the image object corresponding to the imaging process. In these capturing, image parameters other than an exposure time may be uniquely determined.

The control unit 23 successively performs the first to fourth imaging processes to generate the synthesis images in accordance with a synchronous timing at regular intervals (periodically). The synchronous timing corresponds to 25 msec intervals, for example. Here, as shown in FIG. 2, four consecutive synchronous timings are defined as first to fourth synchronous timings 50 to 53. The first to fourth synchronous timings 50 to 53 continuously and repeatedly occur. That is, after the fourth synchronous timing 53, subsequent first to fourth synchronous timings 50 to 53 occur.

The first to fourth imaging processes correspond to the first to fourth synchronous timings 50 to 53. In other words, the control unit 23 performs, synchronizing to the first synchronous timing 50, the first imaging process in order to generate the synthesis image 1. The control unit 23 performs, synchronizing to the second synchronizing timing 51, the second imaging process in order to generate the synthesis image 2. The control unit 23 performs, synchronizing to the third synchronizing timing 52, the third imaging process in order to generate the synthesis image 3. The control unit 23 performs, synchronizing to the fourth synchronizing timing 53, the fourth imaging process in order to generate the synthesis image 4.

The long exposure periods 101, 111, 121, and 131 illustrate the exposure timings of the long exposure imaging in the first to fourth imaging processes. The long exposure periods 101, 111, 121, 131 exemplify exposure timings, when the exposure is performed over the maximum exposure time in these long exposure imaging. Also, the short exposure periods 102, 112, 122 and 132 illustrate exposure timings of the short exposure imaging in the first to fourth imaging processes. The short exposure periods 102, 112, 122 and 132 exemplifies exposure timings, when the exposure is performed over the maximum exposure time in these short exposure imaging. The total exposure periods 100 to 130 shown in FIG. 2 illustrate exposure timings in two image captures in the first to fourth imaging processes.

In other words, in each imaging process, the long exposure imaging precedes the short exposure imaging. In other words, the long exposure imaging in each imaging process is performed before the synchronous timing to which the imaging process synchronizes. More particularly, the long exposure imaging is performed so as to complete the exposure at the time when the synchronous timing arrives. Meanwhile, the short exposure imaging in each imaging process is performed after the synchronous timing to which the imaging process synchronizes. Specifically, the short exposure imaging is performed such that the exposure starts at the synchronous timing.

Therefore, in each period from the synchronous timing to the subsequent synchronous timing, the long exposure imaging in the subsequent imaging process is performed after the preceding short exposure imaging is performed.

It should be noted that the short exposure imaging may precede the long exposure imaging in each imaging process. In other words, in respective imaging processes, the short exposure imaging may be completed at the respective synchronous timings 50 to 53 come, and the long exposure imaging may be started at the respective synchronous timings 50 to 53.

The exposure timing of these imaging processes is adjusted, based on these maximum exposure time, such that exposure periods of a plurality of imaging processes in the first to fourth imaging process are not overlapped.

Specifically, the maximum exposure time (i.e., short exposure period 102) of the short exposure imaging in the first imaging process is shorter than the maximum exposure time (i.e., short exposure periods 112, 122, 132) of the short exposure imaging in other imaging processes. Accordingly, the maximum exposure time (i.e., long exposure period 111) of the long exposure imaging in the second imaging process is longer than the maximum exposure time (i.e., long exposure periods 101, 121, 131) of the long exposure imaging in other imaging processes. In other words, an imaging process having the longest maximum exposure time of the long exposure imaging is defined as the second imaging process.

The maximum exposure time (i.e., short exposure periods 112 and 122) of the short exposure imaging in the second and third imaging processes is longer than the maximum exposure time (i.e., short exposure periods 102, 132) of the short exposure imaging of other imaging processes. Hence, the maximum exposure time (i.e., long exposure periods 121, 131) of the long exposure imaging in the third and fourth imaging processes is shorter than the maximum exposure time (i.e., long exposure periods 101, 111) of the long exposure imaging in other imaging processes. In other words, imaging processes having shorter maximum exposure time of the long exposure imaging are determined as the third and fourth imaging processes.

3. Effects

According to the present embodiment, the following effects can be obtained.

(1) According to the imaging device 1 of the present embodiment, in each of the first to fourth imaging processes, a plurality of image captures are performed before/after the synchronous timing. Thus, as a total exposure time of a plurality of image captures in each of the imaging processes, a period longer than the interval of the synchronous timing can be secured. Also, an interval can be shortened between a plurality of imaging in the preceding imaging process, and a plurality of imaging in the subsequent imaging process.

Thus, in respective capturing of the first to fourth images, appropriate exposure time can be secured. Accordingly, by using HDR rendering based on the captured images obtained by respective imaging processes, synthesis images having appropriate image qualities can be generated. Also, the time required for these capturing images can be reduced. Therefore, by using HDR rendering, a plurality of synthesis images having different image qualities can be appropriately and smoothly generated.

(2) The synthesis images 1 to 4 generated by the first to fourth imaging processes are provided to the ECU 2. Then, the ECU 2 performs driving assist operations based on the synthesis images 1 to 4. Also, synthesis images correspond to different image objects, and have image qualities suitable for recognizing corresponding image objects. Accordingly, the ECU 2 is able to perform favorable driving assist operation based on the synthesis images 1 to 4.

(3) The imaging device 1 is mounted on a vehicle. Therefore, the synthesis images 1 to 4 generated by the imaging device 1 can be favorably used for the driving assist.

(4) According to the first to fourth imaging processes, a long-period exposure imaging and a short-period exposure imaging are performed. In the respective imaging processes, the long-period exposure imaging is performed before the synchronous timing and the short-period exposure imaging is performed after the synchronous timing. Therefore, appropriate exposure time can be secured for respective capturing in the imaging processes.

(5) In the first to fourth imaging processes, two image captures, that is, the long-period exposure imaging and the short-period exposure imaging are performed. Hence, an appropriate exposure time can be secured more reliably for each image capture in the imaging processes.

4. Other Embodiments

An embodiment of the present disclosure has been described so far. However, the present disclosure is not limited to the above-described embodiment, and various modifications can be embodied in the present disclosure.

(1) The imaging device 1 according to the above-described embodiment successively performs the first to fourth imaging processes to generate four synthesis images. However, in the imaging device 1 adapted for HDR rendering, imaging processes may be performed N times. Then, the imaging device 1 may generate, with these imaging processes, N types of synthesis images having different image qualities. It should be noted that N is integer and may be 2, 3, or 5 or higher.

(2) The imaging device 1 according to the above-described embodiment successively captures images twice for the HDR rendering in the imaging process. However, the imaging device 1 may successively capture images three times or more with different exposure times. The three capture times may include two types of capture, that is, a long-period exposure and a short-period exposure. In this case, the long-period image capture may match a predetermined level of the maximum exposure time. Similarly, the short-period image capture may be below the predetermined level of the maximum exposure time. Further, similar to the above-described embodiments, either type of imaging may be performed before the synchronous timing and the other one type of imaging may be performed after the synchronous imaging.

Further, in the imaging process, regardless of the types of imaging, each timing of the successive capturing may be determined. In these cases, similar to the above-described embodiment, image-capturing immediately before the synchronous timing is completed at the synchronous timing. Also, the image-capturing immediately after the synchronous timing is started at the synchronous timing. The exposure timing of each capturing in the imaging process is determined not to overlap exposure periods of other image captures.

(3) The imaging device 1 according to the above-described embodiment may be configured as a separate device from the vehicle (e.g., portable device or the like). In this case, the image quality of synthesis images generated in each of the imaging processes may be determined regardless of the image object. Also in this case, the synthesis image generated by the imaging device 1 may be used for other than driving assist. The imaging device 1 as a portable device may be mounted on the vehicle as needed. The imaging device 1 may provide generated synthesis images to an ECU that performs a driving assist in the vehicle.

(4) A plurality of functions included in a single element of the above-described embodiments may be achieved by a plurality of elements, or one function included in a single element may be achieved by a plurality of elements. A plurality of functions included in a plurality of elements may be achieved by a single element, or a function achieved by a plurality of elements may be achieved by a single element. Also, a part of configurations of the above-described embodiments can be omitted. At least part of the above-described configuration may be added to other configurations of the above-described embodiments, or may replace other configuration of the above-described embodiments. It should be noted that various aspects inherent in the technical ideas identified by the scope of claims are defined as embodiments of the present disclosure.

(5) The present disclosure can be achieved with various forms other than the above-described imaging device 1, such as a system having the imaging device 1 as an element, a program executed on a computer to serve as the imaging device 1, a non-transitory tangible recording media such as a semiconductor memory device to which the program is stored, and a method corresponding to an imaging process performed by the imaging device 1.

What is claimed is:

1. An imaging device that performs imaging using an imaging element comprising:

an imaging unit that performs exposure with a predetermined exposure time, thereby performing the imaging;

a control unit that successively performs an imaging process N-times thereby performing a plurality of imaging processes, where N is integer and 2 or more, a plurality of image captures with different exposure times being performed by the imaging unit in each of the imaging processes; and a synthesis unit that generates, by using High Dynamic Range Rendering (HDR) rendering based on a plurality of images acquired by the plurality of image captures, a synthesis image having an expanded dynamic range and being generated for each of the N-times imaging processes, wherein each of the synthesis images generated for each of the N-times imaging processes has a predetermined image quality determined corresponding to each of the synthesis images;

a maximum exposure time of each capturing in each of the N-times imaging processes is determined based on the image quality of the synthesis image generated in corresponding imaging process;

each of the N-times imaging processes is performed in accordance with a corresponding synchronous timing, the N synchronous timings being at regular intervals;

the control unit successively performs, in each of the N imaging processes, the plurality of image captures before/after the corresponding synchronous timing;

the control unit performs one of the plurality of image captures such that the exposure is completed at a time when the synchronous timing occurs, and performs a subsequent another capturing such that the exposure is started at a time when the synchronous timing occurs; and an exposure timing is determined in each of the imaging process based on the maximum exposure time such that exposure times in the N-times imaging processes are not overlapped.

2. The imaging device according to claim 1, wherein
the synthesis image is used for a driving assist in a vehicle;
different image objects are recognized based on a plurality of synthesis images generated by the N-times imaging processes in the driving assist; and
the image quality of each synthesis image generated by the N-times imaging processes is determined by each of the image objects recognized by the image captured in the imaging process.

3. The imaging device according to claim 2, wherein
the imaging device is mounted on the vehicle.

4. The imaging device according to claim 1, wherein
two types of imaging including a long-period exposure imaging and a short-period exposure imaging are performed as the plurality of image captures in each of the N-times image processes;
the exposure time of the long-period exposure imaging is longer than that of the short-period exposure imaging;
the exposure in one type of imaging in each of the N-times imaging processes is performed before the synchronous timing corresponding to a current imaging process in the N-times imaging processes, and the exposure in the other type of imaging in each of the N-time imaging processes is performed after the synchronous timing corresponding to the current imaging process in the N-times imaging processes, whereby the exposure times of respective imaging processes do not overlap with each other.

5. The imaging device according to claim 4, wherein
the control unit performs two different types of imaging in each of the N-times imaging processes.

\* \* \* \* \*